RECEIVING APPARATUS FOR RADIO FREQUENCY SIGNALS

Filed Oct. 11, 1960 3 Sheets-Sheet 1

INVENTOR.
ROGER E. CLAPP
BY Kenway, Jenney & Hildreth
ATTORNEYS

INVENTOR.
ROGER E. CLAPP
BY Kenway, Jenney & Hildreth
ATTORNEYS

Jan. 16, 1962 R. E. CLAPP 3,017,505
RECEIVING APPARATUS FOR RADIO FREQUENCY SIGNALS
Filed Oct. 11, 1960 3 Sheets-Sheet 3
FIG. 3S2
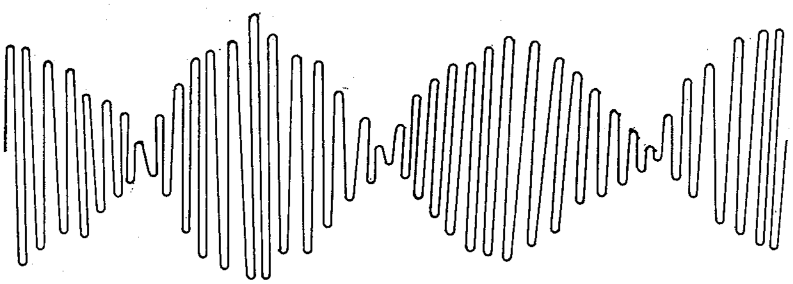
FIG. 3D2
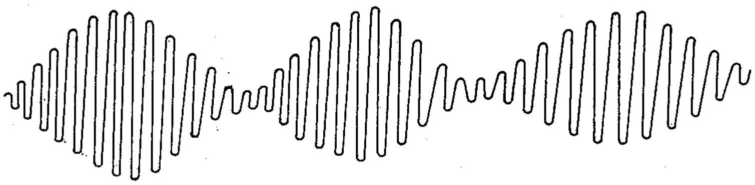
FIG. 3F
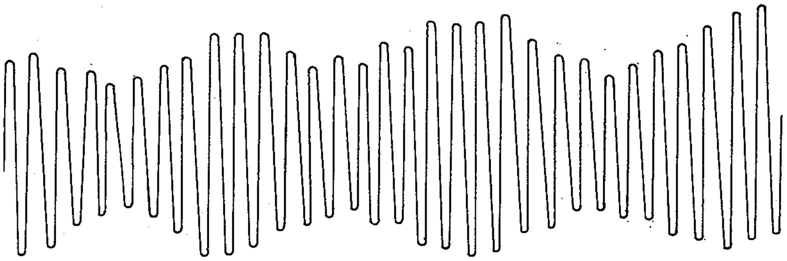
FIG. 3G
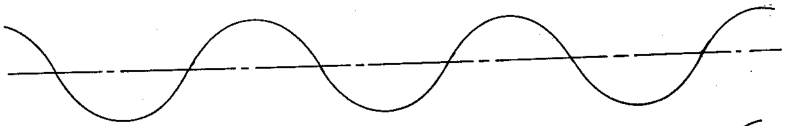
FIG. 3H
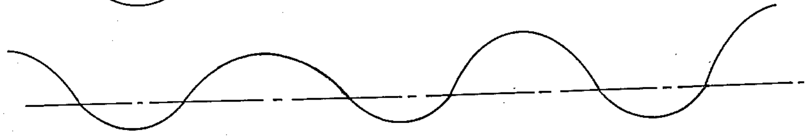
FIG. 3J
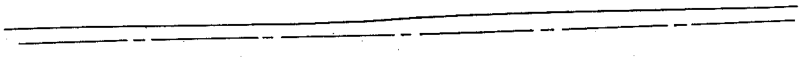
INVENTOR.
ROGER E. CLAPP
BY Kenway, Jenney & Hildreth
ATTORNEYS United States Patent Office 3,017,505

Patented Jan. 16, 1962

3,017,505
RECEIVING APPARATUS FOR RADIO FREQUENCY SIGNALS

Roger E. Clapp, Cambridge, Mass., assignor, by mesne assignments, to AirTechnology Corporation, Cambridge, Mass., a corporation of Delaware Filed Oct. 11, 1960, Ser. No. 61,880
6 Claims. (Cl. 250—20)

This invention relates generally to microwave radiometry and radiometric mapping and more particularly it concerns radiometer signal receiving apparatus.

One of the functions that is performed in a conventional radiometer signal receiver is the comparison of the radiometer signal with a reference signal which is usually obtained from a thermal noise source. As the desired signal sensitivity, that is, the smallest change in radiometer signal to be detected, is usually substantially below the level of extraneous noise, the practice has been to combine a wide pre-detection bandwidth with a long post-detection integration time (that is, a narrow post-detection bandwidth), a procedure which increases the signal-to-noise ratio by a factor equal to the square root of the product of pre-detection frequency bandwidth and post-detection integration time. The method most commonly used is that of chopping the incoming radiometer signal, that is, alternately passing the radiometer signal and the reference signal through a common amplifier channel, and then detecting the output of the amplifier channel in a synchronous detector. By integration of the detector output with a time constant much longer than the chopping period, a signal proportional to the difference between the radiometer signal and the reference signal is obtained.

If the radiometer signal and reference signal are amplified in separate channels, then small fluctuations in the gains of the two channels produce output signal fluctuations sufficient to obscure the desired signal and especially is this so where a large noise signal is also present. As a result of chopping and amplifying in a common amplifier channel, on the other hand, both the radiometer signal and the reference signal are affected equally by the gain fluctuations and cancellation takes place in the subtraction process unless the frequency of the fluctuations is very nearly equal to the chopping frequency or one of its integral multiples.

For certain applications of microwave radiometry, such as radiometric mapping, it is desirable to detect fairly rapid changes in radiometer signal level, as occur for example in the rapid scan of a ground area by airborne radiometric mapping. The available time for post-detection integration is short in this case, which necessitates that the chopping frequency be relatively high. A high chopping frequency is also desirable for the purpose of removing the effects of medium-high-frequency amplifier gain fluctuations.

In the past, ferrite switches and mechanical alternators such as rotating eccentric absorbing disks have been used as choppers. Both the ferrite and mechanical choppers have inherent frequency limitations which prevent their use at high chopping frequencies. Another problem that has been encountered with ferrite and mechanical choppers is the mismatch which is introduced by the switching process and which has the effect of changing the effective gain of the amplification channel at a frequency which is correlated with the chopping frequency and may therefore introduce serious errors in the measurements.

An object of the present invention, therefore, is to provide radiometer signal receiving apparatus which incorporates an improved chopping arrangement.

A more specific object is to apply electronic chopping techniques to a radiometer signal receiver. A further object is to provide a chopping technique which can be used at very high chopping frequencies, such as one megacycle per second.

A still further object is to provide a chopping technique which does not introduce into the receiving apparatus any impedance changes or gain fluctuations.

An additional object is to provide radiometer signal receiving apparatus which is substantially unaffected by pulsed interference signals.

The novel features of the invention together with further objects and advantages will become apparent from the following detailed description and the drawings to which it refers. In the drawings:

FIGS. 3A–3J illustrate waveforms found in the apparatus of FIG. 1.

Figures 1, 2:
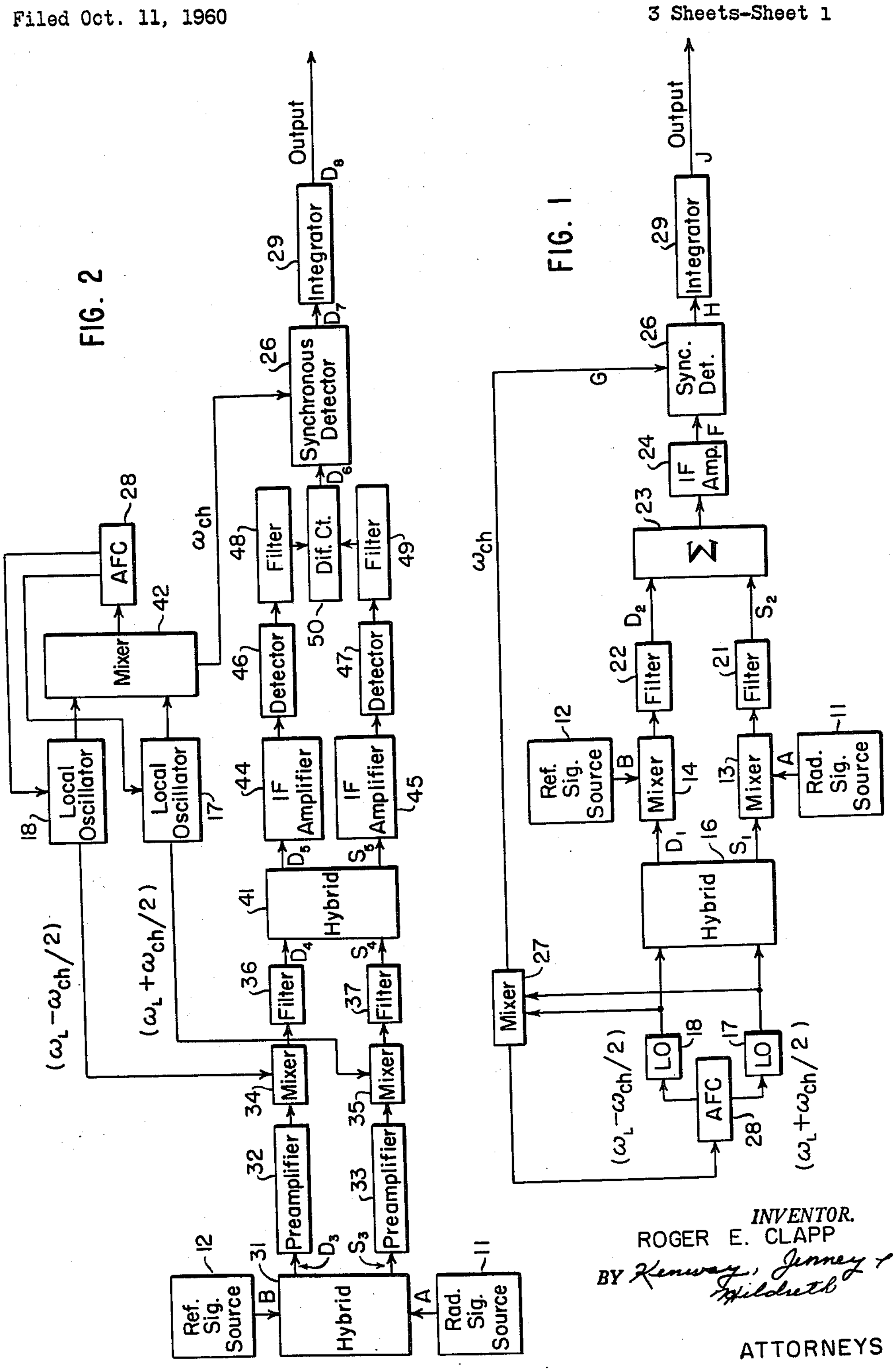
FIG. 1 is a block diagram of radiometer signal receiving apparatus in accordance with the present invention.
FIG. 2 is a block diagram of an alternative form of apparatus also in accordance with the invention.

With reference first to FIG. 1 it will be observed that the numeral 11 represents a source of radiometer signals, such as a parabolic antenna, and the numeral 12 designates a source of reference signals to be compared with the radiometer signals. Coupled to source 11 is a mixer 13, and coupled to source 12 is a mixer 14. Sum and difference signals from a hybrid 16 are injected into the respective mixers 13, 14, the input arms of the hybrid being supplied with signals from a pair of local oscillators 17 and 18. Oscillators 17 and 18 operate at slightly different frequencies $(\omega_L+\omega_{ch}/2)$ and $(\omega_L-\omega_{ch}/2)$, the frequency difference between them corresponding to the desired chopping frequency $\omega_{ch}$.

Connected to the output of the respective mixers 13, 14 are filters 21, 22 broadly tuned to the difference frequency $(\omega-\omega_L)$ between the source frequency $\omega$ and the average frequency $\omega_L$ of the two local oscillators, and coupled to the output sides of the filters is a circuit 23 for summing the respective IF signals. The sum signal derived by this circuit is amplified by an intermediate-frequency amplifier 24, which is broadly tuned to cover the same frequency band as that passed by the filters 21 and 22, this bandwidth, in practice, being large compared with $\omega_{ch}$. The output signal from the IF amplifier 24 is applied to a detector 26 for rectification and synchronous detection at the frequency $\omega_{ch}$. For this purpose, the difference of the local oscillator frequencies is detected and passed to the synchronous detector 26 in the form of a synchronizing signal from a mixer 27 whose inputs comprise the signals from the two local oscillators. The mixer 27 also provides the necessary input signals to an automatic frequency control device 28 which stabilizes the frequencies of the local oscillators 17, 18. Finally, the demodulated signal from detector 26 is integrated in an integrator 29 from whence the receiver output signal is obtained.

The operation of the apparatus according to the invention can best be understood with reference to the waveforms of FIG. 3. The waveform $3S_1$ represents schematically the output of the sum arm of the hybrid 16 in FIG. 1, and corresponds to the sum of the signals from the two local oscillators 17, 18. The beating of the two continuous wave signals is clearly indicated; the envelope of the waveform is proportional to $\cos(\omega_{ch}/2)t$. The power level which is proportional to the square of the voltage is therefore proportional to $(1+\cos \omega_{ch}t)/2$, and changes from maximum to zero to maximum with a cyclical regularity at the frequency $\omega_{ch}$. The voltage waveform $S_1$ can be represented mathematically by the expression:

$$S_1=(L/2)\cos(\omega_L-\omega_{ch}/2)t+(L/2)\cos(\omega_L+\omega_{ch}/2)t$$
$$=L\cos\omega_L t\cos(\omega_{ch}/2)t \quad (1)$$

The waveform $3D_1$ in FIG. 3 represents the output of the difference arm of the hybrid 16 in FIG. 1, and results from the difference of the signals from the two local oscillators 17, 18. The envelope is proportional to $\sin(\omega_{ch}/2)t$, and the power level is proportional to $(1-\cos\omega_{ch}t)2$, which changes from zero to maximum to zero with cyclic regularity at the frequency $\omega_{ch}$, but with a phase shift of 180° (referred to the frequency $\omega_{ch}$) as compared with the power level in the sum waveform $S_1$. The voltage waveform $D_1$ can be represented mathematically by the expression $$D_1=(L/2)\cos(\omega_L-\omega_{ch}/2)t-(L/2)\cos(\omega_L+\omega_{ch}/2)t$$
$$=L\sin\omega_L t\sin(\omega_{ch}/2)t \quad (2)$$

where L the oscillator signal amplitude is the same as for $S_1$.

Figure 3A:
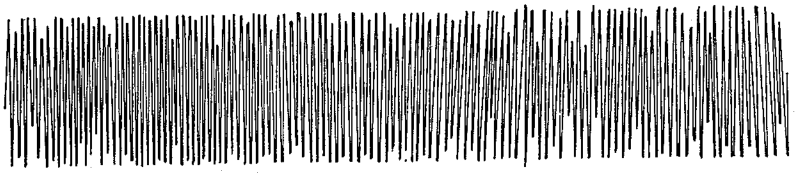
Figure 3B:
Figure 3B:
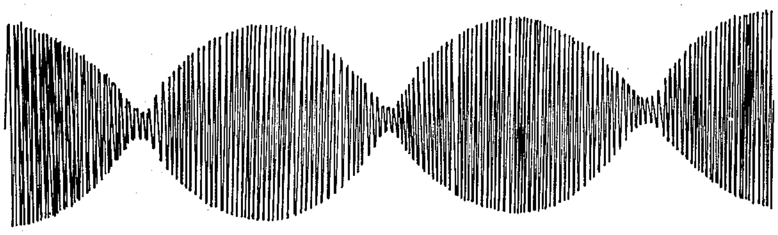
Figure 3B:
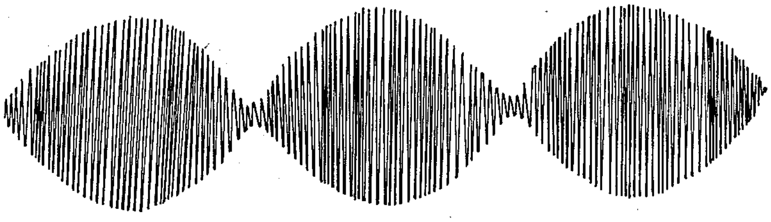

The waveform from the radiometer signal source 11 corresponds to FIG. 3A, and the waveform from the reference signal source 12 corresponds to FIG. 3B. The reference signal B is assumed to have somewhat smaller power level than the power level of the radiometer signal A, for the purposes of this discussion, although the reverse could equally well be the case in actual operation of the system.

The nonlinear characteristic response of the mixer 13 to the two input signals $S_1$ and A produces signals at many frequencies other than those already contained in $S_1$ and A. Among these there is included an output signal whose frequency is the difference of the frequencies of $S_1$ and A. The filter 21 is broadly tuned to the average difference frequency, $(\omega-\omega_L)$, but its pass band is sufficiently wide to include all the difference frequencies between the band of frequencies included in the radiometer signal A and the pair of frequencies, $(\omega_L-\omega_{ch}/2)$ and $(\omega_L+\omega_{ch}/2)$, contained in the signal $S_1$. The center frequency of the pass band of the filter 21 is the intermediate frequency of the receiver. The output of the filter 21 can be considered to be a signal at this intermediate frequency which has an amplitude which is varying with time and a phase which is also varying with time. The amplitude and phase are respectively determined by the amplitudes and phases of the two input signals, $S_1$ and A. If the mixer 13 is operated at a region of its characteristic curve for which it has an approximate square-law response, then the output amplitude will be proportional to the product of the amplitudes of the two input signals. This case is shown in FIG. $3S_2$ which represents the output waveform for the filter 21. In a similar fashion, the mixer 14 and the filter 22 produce an intermediate frequency output signal $D_2$ whose amplitude is proportional to the product of the amplitudes of the reference signal B and the signal $D_1$ from the hybrid 16. It is evident from FIG. $3D_2$ that the signal $D_2$ is modulated in phase opposition to the signal $S_2$, and that the peak amplitudes of $D_2$ are smaller than the peak amplitudes of $S_2$, as a result of the earlier assumption that the average amplitude of the reference signal B is smaller than the average amplitude of the radiometer signal A.

The respective signals $S_2$ and $D_2$ from the filters 21 and 22 are combined in an intermediate-frequency summing circuit 23, the output of which is illustrated in FIG. 3F. In FIG. 3F the average envelope is modulated at the frequency $\omega_{ch}$, with the modulation ratio approximately equal to the ratio of the amplitudes of signals A and B, and with the phase of the modulation, relative to the phase of the signal $S_1$, indicating that signal A is larger than signal B. If B were larger than A, a waveform similar to F would be obtained from summing circuit 23 but there would be a 180° phase shift in the modulation, and an interchange of the positions of the modulation minima and maxima in FIG. 3F.

The waveform of FIG. 3F which represents by its $\omega_{ch}$ modulation the desired information as to the relative amplitudes of signals A and B, is reproduced in amplified form by the intermediate frequency amplifier 24. It is clearly evident that any gain fluctuations of the IF amplifier 24 will not degrade the modulation signal unless the gain fluctuations are of a frequency comparable to $\omega_{ch}$ or one of its integral multiples. Since gain fluctuations of relatively low frequency present the most problems, and since the modulation frequency $\omega_{ch}$ can be much higher than would be convenient or possible with a mechanical or ferrite chopper, the advantages of the present invention are clear.

FIG. 3G represents the synchronizing signal of frequency $\omega_{ch}$ derived from the output signals of the local oscillators 17 and 18 and applied to detector 26. This signal is so phased that its maximum positive excursion occurs at the same time that $S_1$ reaches its maximum and its maximum negative excursion occurs at the same time that $S_1$ passes through a minimum. The output waveform of the synchronous detector is shown in FIG. 3H, where some filtering of the highest frequency components of the rectified signal is assumed to have taken place within the detector. Remaining components of the waveform 3H of frequency $\omega_{ch}$ or higher are removed by integrator 29 which acts as a low-pass filter. The waveform shown in FIG. 3J is the output waveform from the integrator 29, its magnitude being a direct measure of the desired quantity, the magnitude of the radiometer signal A relative to the reference signal B.
radiometer signal A relative to the reference signal B.

In the embodiment of FIG. 1, described in the foregoing, the radiometer and reference signals do not traverse the same paths throughout the apparatus but instead are applied to different mixer channels. In FIG. 2 there is illustrated another embodiment of the invention which avoids the problem of unbalance introduced by the parallel mixer channels of FIG. 1. With reference now to FIG. 2 it will be observed that the radiometer and reference signal sources 11 and 12, respectively, are coupled directly to the respective input arms of a hybrid 31 where the radiometer and reference signals are combined at the outset. The sum and difference arms of the hybrid 31 are coupled by means of two parallel channels to the respective input arms of another hybrid 41. The channel coupled to the difference arm includes a preamplifier 32 (which may be omitted if desired), a mixer 34, and a passive filter network 36, in that order. The channel to which the sum arm is coupled includes a preamplifier 33, a mixer 35, and a filter 37 of like nature as their counterparts in the first-mentioned of the channels. Mixers 34 and 35, respectively, are supplied with local oscillator signals from oscillators 18 and 17 which are identical with the local oscillators described in connection with FIG. 1. In addition, there is provided a mixer 42 to which both local oscillator signals are supplied for the purpose of deriving AFC error signals which reflect deviations in the frequencies of both local oscillators. These error signals are converted into useful automatic frequency control signals by conventional means 28 such as has been described in connection with FIG. 1, the control signals being fed back to the local oscillators to control their frequencies.

The sum and difference arms of hybrid 41 are likewise coupled to parallel channels comprising broad band IF amplifiers 44, 45, detectors 46, 47 and low-pass filters 48, 49. The output signals from these channels are combined in a difference circuit 50, the resultant difference signal being applied to a synchronous detector 26 and integrator 29 like those of FIG. 1. Similarly, the synchronous detector is synchronized with a reference signal whose frequency corresponds to the difference frequency of the local oscillators, the reference signal in this case being derived from the mixer 42.

The operation of the embodiment of FIG. 2 will be described under the assumption that the radiometer and reference signals A and B can be represented generally as:

$$A=A' \cos \omega t+A'' \sin \omega t \quad (3)$$

$$B=B' \cos \omega t+B'' \sin \omega t \quad (4)$$

wherein the coefficients A′, A″, B′, B″, each vary with time in an unpredictable manner limited only by the frequency band of center frequency $\omega$ to be associated with the signals A and B. The signals A and B are summed in the hybrid 31 and combined with the local oscillator signal of frequency $(\omega_L+\omega_{ch}/2)$ in the mixer 35, the resultant intermediate frequency signal being selectively transmitted by filter 37 to one of the input arms of the hybrid 41. Also, the signals A, B are differenced in the hybrid 31 and passed to the mixer 34 where they are combined with the local oscillator signal of frequency $(\omega_L-\omega_{ch}/2)$, the resultant intermediate frequency signal being passed by the filter to the other input arm of the hybrid 41. Thus the hybrid 41 operates in the intermediate frequency region, which is centered approximately at the frequency $(\omega-\omega_L)$, whereas the hybrid 31 operates in the region of the signal frequency band centered at the frequency $\omega$. In terms of the input signals A and B, Equations 3 and 4, the sum and difference outputs from the hybrid 31 are:

$$S_3=A/2+B/2 \quad (5)$$

$$D_3=A/2-B/2 \quad (6)$$

The respective output waveforms from the filters 37 and 36 are:

$$S_4=(L/2)(A'+B') \cos (\omega-\omega_L-\omega_{ch}/2)t +(L/2)(A''+B'') \sin (\omega-\omega_L-\omega_{ch}/2)t \quad (7)$$

$$D_4=(L/2)(A'-B') \cos (\omega-\omega_L+\omega_{ch}/2)t +(L/2)(A''-B'') \sin (\omega-\omega_L+\omega_{ch}/2)t \quad (8)$$

Although the Formulas 7 and 8 were obtained under the assumption that square-law mixing is used, it should be noted that since there is no amplitude modulation of the local oscillator signal fed to either mixer 35 or 34, it is immaterial whether the output amplitude at the intermediate frequency is or is not directly proportional to the input local oscillator amplitude. For the successful operation of the embodiment of FIG. 2 it is required, however, that the phase of the intermediate frequency signal follow the phase of the local oscillator signal, as shown in Equations 7 and 8, in contrast to the embodiment of FIG. 1, where it is the amplitude of the intermediate frequency signal which necessarily follows the amplitude modulation carried by the local oscillator signals $S_1$ and $D_1$, as shown in FIGS. 3A–3J. In conventional mixers the output phase always follows any phase change in the input local oscillator signal, but the output amplitude only follows a change in input local oscillator amplitude when the average input local oscillator power level is kept rather low.

The operation of the hybrid 41 on the two intermediate frequency signals $S_4$ and $D_4$ gives as sum and difference outputs the respective signals $S_5$ and $D_5$:

$$\begin{aligned} S_5&=(S_4+D_4)/2 \\ &=(L/2)A' \cos (\omega-\omega_L)t \cos (\omega_{ch}/2)t \\ &+(L/2)B' \sin (\omega-\omega_L)t \sin (\omega_{ch}/2)t \\ &+(L/2)A'' \sin (\omega-\omega_L)t \cos (\omega_{ch}/2)t \\ &-(L/2)B'' \cos (\omega-\omega_L)t \sin (\omega_{ch}/2)t \quad (9) \end{aligned}$$

$$\begin{aligned} D_5&=(S_4-D_4)/2 \\ &=(L/2)A' \sin (\omega-\omega_L)t \sin (\omega_{ch}/2)t \\ &+(L/2)B' \cos (\omega-\omega_L)t \cos (\omega_{ch}/2)t \\ &-(L/2)A'' \cos (\omega-\omega_L)t \sin (\omega_{ch}/2)t \\ &+(L/2)B'' \sin (\omega-\omega_L)t \cos (\omega_{ch}/2)t \quad (10) \end{aligned}$$

The signal $S_5$, after it is amplified in the intermediate frequency amplifier 45, detected and filtered, can be mathematically expressed as the low-frequency portion of $S_5^2$, $$\text{or } (L^2/16)(A'^2+A''^2+B'^2+B''^2) +(L^2/16)(A'^2+A''^2-B'^2-B''^2) \cos \omega_{ch}t -(L^2/8)(A'B''-A''B') \sin \omega_{ch}t \quad (11)$$

Similarly after the intermediate frequency signal $D_5$ is amplified in the amplifier 44, detected and filtered, it can be expressed as a portion of the signal $D_5^2$, $$\text{or } (L^2/16)(A'^2+A''^2+B'^2+B''^2) -(L^2/16)(A'^2+A''^2-B'^2-B''^2) \cos \omega_{ch}t +(L^2/8)(A'B''-A''B') \sin \omega_{ch}t \quad (12)$$

Difference circuit 50 serves to subtract one from the other of these signals given by Equations 11 and 12, the difference signal resulting from this operation, $$D_6=(L^2/8)(A'^2+A''^2-B'^2-B''^2) \cos \omega_{ch}t -(L^2/4)(A'B''-A''B') \sin \omega_{ch}t \quad (13)$$

being passed to the synchronous detector 26, where it is multiplied by the factor cos $\omega_{ch}t$, representing the difference voltage from the mixer 42, to give the product signal:

$$D_7=(L^2/16)(A'^2+A''^2-B'^2-B''^2) +(L^2/16)(A'^2+A''^2-B'^2-B''^2) \cos 2\omega_{ch}t -(L^2/8)(A'B''-A''B') \sin 2\omega_{ch}t \quad (14)$$

The signal $D_7$ from the synchronous detector 26 is passed to the integrator 29, which serves as a low-pass filter, removing the components of $D_7$ which are periodic and in particular removing the $2\omega_{ch}$ frequency component. The integration is carried out over a time interval which is long compared to the chopping period, while the chopping period is itself long compared to the time over which the signals A and B maintained autocorrelation (it having been assumed that the chopping frequency is small in comparison with the frequency bandwidth of signals A and B).

As a consequence of the relatively long integration time, the fluctuations and oscillations included in $D_7$ are averaged out, leaving as the output of the integrator 29 a signal proportional to the time average of $D^7$, which is:

$$D_8=\text{Av}\{(L/16)(A'^2+A''^2-B'^2-B''^2)\} =\text{Av}\{(L^2/16)(A^2-B^2)\} \quad (15)$$

where $$A^2=A'^2+A''^2 \quad (16)$$

$$B^2=B'^2+B''^2 \quad (17)$$

The output signal $D_8$ is representative of the desired quantitative relation between the signal A and the reference signal B. Because of the very high chopping frequencies which can be used with this invention, the integration time, while long compared with the chopping period, may nevertheless be kept short in comparison with other time intervals characteristic of the systems in which this invention might be incorporated.

The intermediate frequency amplifiers 45 and 44 are designed to be as nearly identical as is practicable, and in particular to have the same saturation level for very strong input signals. A strong input pulse which is received as a part of the radiometer signal A, caused for example by interference from a pulsed radar whose freqency lies within the radiometer frequency band, will usually saturate both amplifiers, since signal A is carried on both amplifier channels, as shown by Equations 9 and 10, except for very brief instants when cos $(\omega_{ch}/2)t$ or sin $(\omega_{ch}/2)t$ is zero. A pulse which saturates both channels appears as a video pulse at the output of filter 49 and an identical video pulse at the output of filter 48. These two outputs are subtracted from one another in the difference circuit 50, and the pulse accordingly does not appear in the output $D_6$, except for a brief time interval during which the signal $D_6$ is reduced to zero. The error introduced in this way will in practice be small compared to the error that would otherwise be introduced by a strong interference pulse in a radiometer receiver which did not remove the pulse.

If there is a small difference between the gain of amplifier 45 and the gain of amplifier 44, the removal of pulsed interference will not be affected thereby, provided that the saturation levels of the two amplifier channels, as measured at the outputs of filters 49 and 48, are identical. Nor will a small difference in gain between the two intermediate frequency amplifier channels introduce errors into the measurement of the desired quantity ($A^2-B^2$). In fact, either of the two intermediate frequency amplifiers, 45 or 44, could be omitted, since the synchronous detector 26 would select from either Equation 11 or Equation 12 the desired term proportional to ($A^2-B^2$), although the simpler receiving system that would result would not have the desirable feature of eliminating pulsed interference.

Small differences in gain between the two parallel channels that connect the outputs of hybrid 31 to the inputs of hybrid 41 also will not greatly affect the measurement of ($A^2-B^2$). It can be demonstrated mathematically that, because the radiometer and reference signals are combined at the outset, small differences in gain between the two preamplifier-mixer-filter channels have only a second order effect on the final output signal from the synchronous detector 26 and integrator 29. This is a particular advantage of the embodiment shown in FIG. 2, over that shown in FIG. 1.

Although the invention has been described in connection with but two embodiments, those skilled in the art will appreciate that other embodiments and modifications within the spirit and scope of the invention are possible. For example, it is not essential to employ square-law mixers and detectors as were assumed for the purpose of the mathematical analyses set out in the foregoing. Also, the principles of the invention can be applied to parametric amplifiers in which the phase of the output signal is directly related to the phases of both the input signal and the pump signal. In such case, the sum of the radiometer and reference signals, in the embodiment of FIG. 2, should be pumped at a frequency $f_1$ and the difference of these signals pumped at a frequency $f_2$. The effective chopping frequency is then equal to the difference of the frequencies $f_1$ and $f_2$.

Accordingly, the invention should not be limited to the details of what has been described herein by way of example but rather it should be deemed to be limited only to the scope of the appended claims.

What is claimed is:

1. Signal receiving apparatus adapted to detect the amplitude relation between a received signal and a reference signal of radio frequency, said apparatus comprising means to provide a pair of local oscillator signals having a relatively small frequency displacement, a hybrid network having a pair of input circuits for said local oscillator signals and a pair of output circuits to provide local oscillator signals modulated in amplitude at the same frequency but in phase opposition to one another, a first mixer having an input circuit for one of said amplitude modulated local oscillator signals and said received signal, a second mixer having an input circuit for the other of said amplitude modulated local oscillator signals and said reference signal, said mixers providing a pair of intermediate frequency signals, means for combining said intermediate frequency signals to obtain a composite signal of intermediate frequency representing alternately the magnitudes of said radio frequency signals, and means to derive an output signal representative of the amplitude modulation of said composite signal at the frequency corresponding to the difference frequency of said local oscillator signals.

2. Signal receiving apparatus adapted to detect the amplitude relation between a received signal and a reference signal of radio frequency, said apparatus comprising means to provide a pair of local oscillator signals having a relatively small frequency displacement, a hybrid network having a pair of input circuits for said local oscillator signals and a pair of output circuits to provide local oscillator signals modulated in amplitude at the same frequency but in phase opposition to one another, a first mixer having an input circuit for one of said amplitude modulated local oscillator signals and said received signal, a second mixer having an input circuit for the other of said amplitude modulated local oscillator signals and said reference signal, said mixers providing a pair of intermediate frequency signals, a summing circuit, means for selectively transmitting said intermediate frequency signals to said summing circuit and for deriving from said summing circuit a composite signal of intermediate frequency representing alternately the magnitudes of said radio frequency signals, means to derive a sinusoidal difference frequency signal from said local oscillator signals, means to detect said composite signal in synchronism with said difference frequency signal, and means to integrate the detected signal.

3. Signal receiving apparatus adapted to detect the amplitude relation between a received signal and a reference signal of radio frequency, said apparatus comprising means to provide a pair of local oscillator signals having a relatively small frequency displacement, a first hybrid network having a pair of input circuits for the respective radio frequency signals and a pair of output circuits, a pair of mixers coupled to the respective local oscillators and to the respective output circuits of said first hybrid network to provide a pair of intermediate frequency signals, means for selectively transmitting said intermediate frequency signals, a second hybrid network having a pair of input circuits for the respective intermediate frequency signals and a pair of output circuits, an intermediate frequency amplifier coupled to one of the output circuits of said second hybrid network to provide a composite signal of intermediate frequency representing alternately the magnitudes of said radio frequency signals, and means to derive an output signal representative of the amplitude modulation of said composite signal at the frequency corresponding to the difference frequency of said local oscillator signals.

4. Signal receiving apparatus adapted to detect the amplitude relation between a received signal and a reference signal of radio frequency, said apparatus comprising means to provide a pair of local oscillator signals having a relatively small frequency displacement, a first hybrid network having a pair of input circuits for the respective radio frequency signals and a pair of output circuits, a pair of mixers coupled to the respective local oscillators and to the respective output circuits of said first hybrid network to provide a pair of intermediate frequency signals, means for selectively transmitting said intermediate frequency signals, a second hybrid network having a pair of input circuits for the respective intermediate frequency signals and a pair of output circuits, a pair of intermediate frequency amplifiers coupled to the respective output circuits of said second hybird network to provide composite signals of intermediate frequency representing alternately the magnitudes of said radio frequency signals, a pair of detectors coupled to the respective intermediate frequency amplifiers, means coupled to the detectors to provide an amplitude difference signal representative of the amplitude difference of the detected signals, means to produce a frequency difference signal from said local oscillator signals, means to detect said amplitude difference signal in synchronium with said frequency difference signal, and means to integrate the synchronously-detected signal.

5. Signal receiving apparatus adapted to detect the amplitude relation between a received signal of relatively low amplitude and a reference signal of relatively low amplitude, both being signals of radio frequency, in the presence of interference consisting of radio frequency pulses of relatively high amplitude, included with the received signal or with the reference signal or with both signals, said apparatus comprising means to provide a pair of local oscillator signals having a relatively small frequency displacement, a first hybrid network having a pair of input circuits for the respective radio frequency signals and a pair of output circuits, a pair of mixers coupled to the respective local oscillators and to the respective output circuits of said first hybrid network to provide a pair of intermediate frequency signals, means for selectively transmitting said intermediate frequency signals, a second hybrid network having a pair of input circuits for the respective intermediate frequency signals and a pair of output circuits, a pair of intermediate frequency amplifiers coupled to the respective output circuits of said second hybrid network to provide composite signals of intermediate frequency representing alternately the magnitudes of said radio frequency signals, said intermediate frequency oscillators having substantially the same saturation level, a pair of detectors coupled to the respective intermediate frequency amplifiers, means coupled to the detectors to provide an amplitude difference signal which is representative of the amplitude difference of the detected signals for signals which do not saturate either amplifier, but which is substantially zero for detected signals which saturate both amplifiers, means to produce a frequency difference signal from said local oscillator signals, means to detect said amplitude difference signal in synchronism with said frequency difference signal, and means to integrate the synchronously-detected signal.

6. Signal receiving apparatus adapted to detect the amplitude relation between the signals of a first pair, one consisting of a received signal and the other consisting of a reference signal, said apparatus comprising means to provide a second pair of signals, each consisting of a local oscillator signal, a hybrid network having a pair of input circuits and a pair of output circuits, the signals of one of said pairs being applied to said input circuits, respectively, a pair of mixers coupled to the output circuits of said hybrid network, respectively, the signals of the other of said pairs being applied to said mixers to provide a pair of intermediate frequency signals, means for arithmetically combining the intermediate frequency signals from said mixers to obtain a composite signal having sinusoidal modulations representing alternately the magnitudes of said first pair of singals, means to derive a difference frequency signal from said local oscillator signals, and means to detect said composite signal in synchronism with said difference frequency signal.

References Cited in the file of this patent

UNITED STATES PATENTS

| | | |
|---|---|---|
| 2,709,796 | Rorman et al. | May 31, 1955 |
| 2,808,583 | Mathes | Oct. 1, 1957 |
| 2,855,506 | Schabauer | Oct. 7, 1958 |
| 2,955,199 | Mindes | Oct. 4, 1960 |